United States Patent [19]

Shimbo

[11] Patent Number: 4,935,831
[45] Date of Patent: Jun. 19, 1990

[54] CASSETTE TAPE DRIVE APPARATUS
[75] Inventor: Takaichi Shimbo, Kodiara, Japan
[73] Assignee: Emu II SHII Co. Ltd., Tokyo, Japan
[21] Appl. No.: 241,885
[22] Filed: Sep. 8, 1988
[30] Foreign Application Priority Data
 May 25, 1988 [JP] Japan .................................. 63-128705
[51] Int. Cl.⁵ .............................................. G11B 5/54
[52] U.S. Cl. ................................................... 360/105
[58] Field of Search ..................... 360/105, 96.3, 96.4, 360/75

[56] References Cited
FOREIGN PATENT DOCUMENTS

| 3012956 | 10/1980 | Fed. Rep. of Germany | 360/105 |
| 58-32230 | 2/1983 | Japan | 360/105 |
| 61-76531 | 5/1986 | Japan . | |
| 61-170131 | 10/1986 | Japan . | |

*Primary Examiner*—John H. Wolff
*Attorney, Agent, or Firm*—Sandler, Greenblum & Bernstein

[57] ABSTRACT

A tape cassette drive apparatus is provided with a fly pulley coaxial with a capstan shaft and a fixedly positioned gear is provided coaxially with the fly pulley and secured to move with the pulley. A rotary bar which is capable of rotating about the axis of the capstan shaft and which is provided with an idle gear driven from the fixedly positioned gear and which carries a projection are also provided. The idle gear meshes with an internal gear portion formed coaxially to the capstan shaft while being driven by the fixedly positioned gear of the fly pulley, and the idle gear rotates about the capstan shaft at the same time. The rotary movement of the projection of the idle gear mounted to the rotary bar causes a playback arm movably supported on the body plate to rotate. The playback arm has a projection and a recess portion which permit a head base to move towards and then away from a tape surface. The playback arm and the head base constitute a lock mechanism which locks the head base where it is moved by cooperation between the projection and the recessed portion of the playback arm. Also included is a review arm disposed to face the playback arm in a symmetrical fashion with respect to a plane normal to axis of the capstan shaft thus providing high speed erasing in the device.

5 Claims, 4 Drawing Sheets

CASSETTE TAPE DRIVE APPARATUS

BACKGROUND OF THE INVENTION

1. Field of the Invention

The present invention relates generally to cassette tape drive apparatus and, more particularly, to a cassette tape drive apparatus capable of performing the same function as a solenoid-operated drive apparatus without the need to use any solenoid in a mechanism for causing a recording and reproducing head base to move toward and away from the tape surface of a cassette tape.

2. Description of the Prior Art

It is known that such a solenoid is used in a cassette tape drive apparatus loaded in, for example, an automatic answering telephone set. In such a cassette tape drive apparatus, a head base which carries a magnetic recording and reproducing head, a pinch roller and the associated components is adapted to move forward and backward by means of the solenoid. The magnetic head is maintained in contact with the tape surface of a cassette tape to record signals on the cassette tape or pick up signals recorded thereon. The signals thus picked up are subjected to amplification followed by reproduction.

However, the above-described cassette tape drive apparatus for an automatic answering telephone set or the like involves the following problems. For example, since the solenoid is used to move the head base which carries the magnetic head, the pinch roller and the associated components toward and away from the tape surface of a cassette tape, a large electric current is consumed and it is, therefore, impossible to drive such a solenoid by the limited power provided by small-size dry batteries. For this reason, such solenoid-operated cassette tape drive apparatus require an AC-DC adapter of large capacity and hence of large external size.

Furthermore, when such a solenoid is incorporated in a cassette tape deck, the cassette tape deck becomes heavy by the weight of the solenoid and the external size of the cassette tape deck increases.

SUMMARY OF THE INVENTION

It is, therefore, a primary object of the present invention to provide a cassette tape drive apparatus in which it is possible to solve the above-described problems involved in the prior art.

To achieve the above and other objects, in accordance with a first aspect of the present invention, there is provided a cassette tape drive apparatus having a capstan shaft, a pair of reels and magnetic heads, comprising a fly pulley disposed coaxially to the capstan shaft; a fixed gear formed coaxially to and integrally with said fly pulley; a rotary bar disposed for rotation about the axis of the capstan shaft, the rotary bar provided with an idle gear and a projection; the aforesaid fly pulley having an internal gear portion capable of meshing with the idle gear which is meshed with the fixed gear for rotation about the axis of the idle gear and which moves with a rotary motion as the rotary bar rotates; an arm mechanism disposed on a head base for causing the head base to move toward and away from a tape surface by means of the projection; and a lock mechanism disposed on the head base for locking the head base at a position at which the head base is maintained in contact with the tape surface.

In accordance with a second aspect of the present invention, there is provided a cassette tape drive apparatus further comprising a review arm for enabling high-speed erasure of records on a tape. The review arm and the playback arm according to the first aspect are disposed on symmetrically opposing sides of a plane normal to the axis of the capstan shaft, and the review arm is rotated back and forth by means of the projection of the rotary bar to move the head base which carries a high-speed erasing head toward and away from the tape surface of the tape carried on the reels.

The above and other objects, features and advantages of the present invention will become apparent from the following description of preferred embodiments thereof, taken in conjunction with the accompanying drawings.

DESCRIPTION OF THE PREFERRED EMBODIMENTS

Preferred embodiments of the present invention will be described below with reference to the accompanying drawings.

Figure 1:
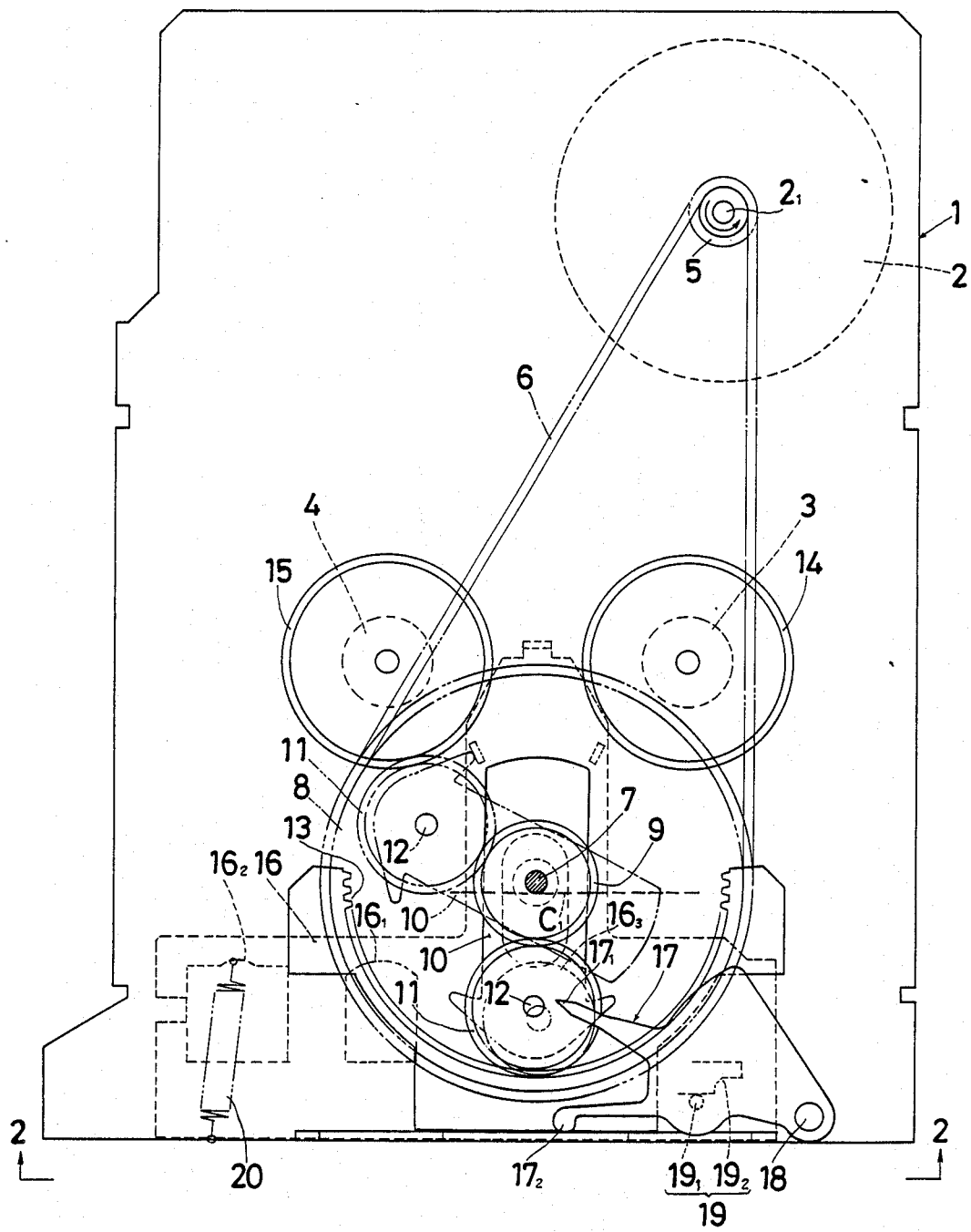
FIG. 1 is a diagrammatic bottom plan view of the essential mechanism of a cassette tape drive apparatus according to a first embodiment of the present invention.
Figure 2:
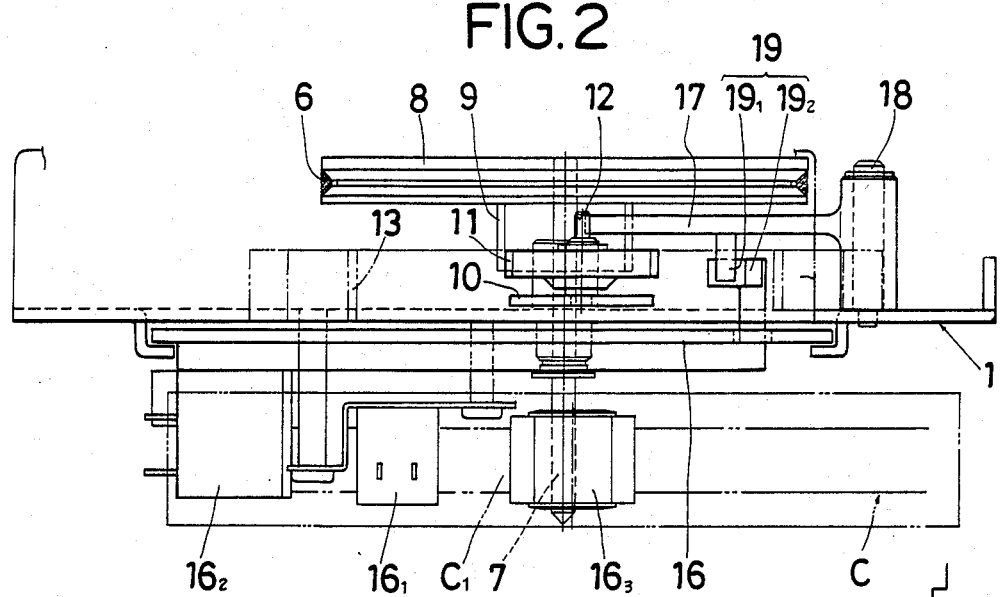
FIG. 2 is a diagrammatic sectional view taken along the line 2—2 of FIG. 1.
Figure 3:
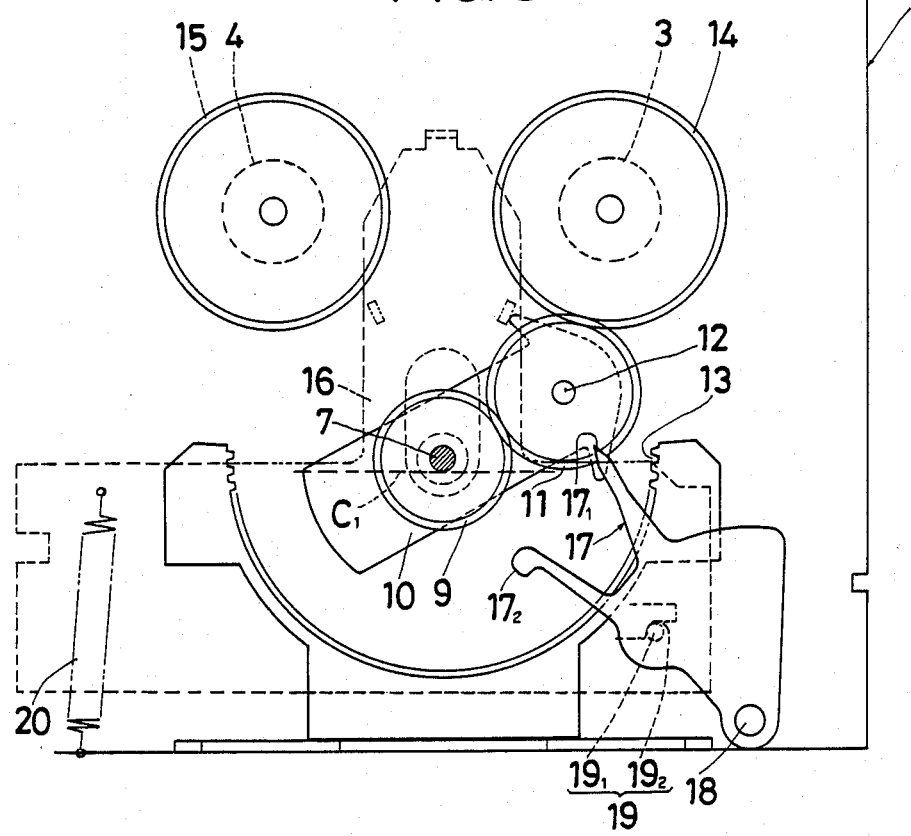
FIG. 3 is a diagrammatic bottom plan view, with portions omitted for the sake of simplicity, of the apparatus shown in FIG. 1, and illustrates a state wherein a head base is advanced to occupy a recording and reproduction position for a tape cassette carried on reels.
Figure 4:
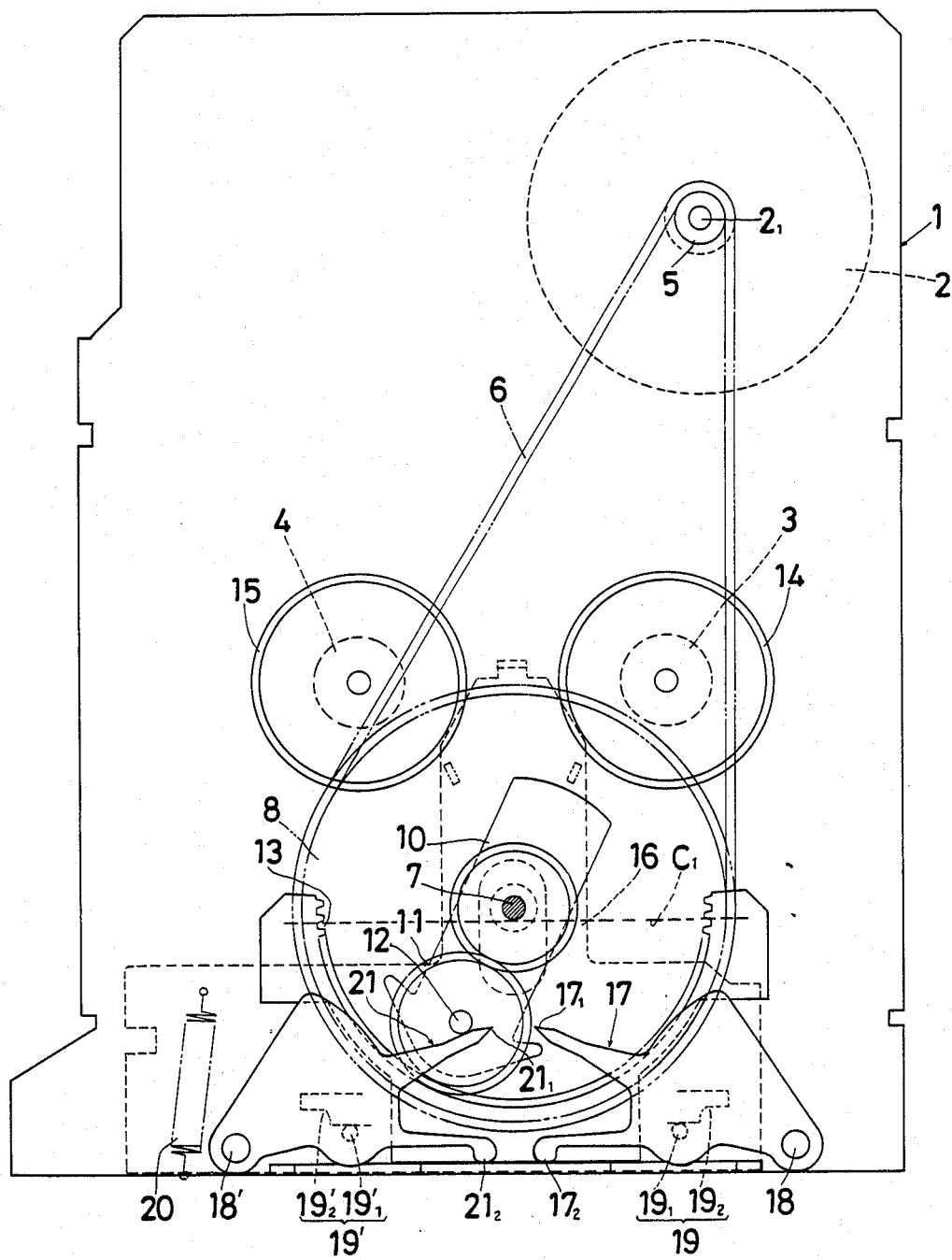
FIG. 4 is a diagrammatic bottom plan view of the essential mechanism of a second embodiment of the cassette tape drive apparatus provided with a high-speed erasing mechanism.
Figure 5:
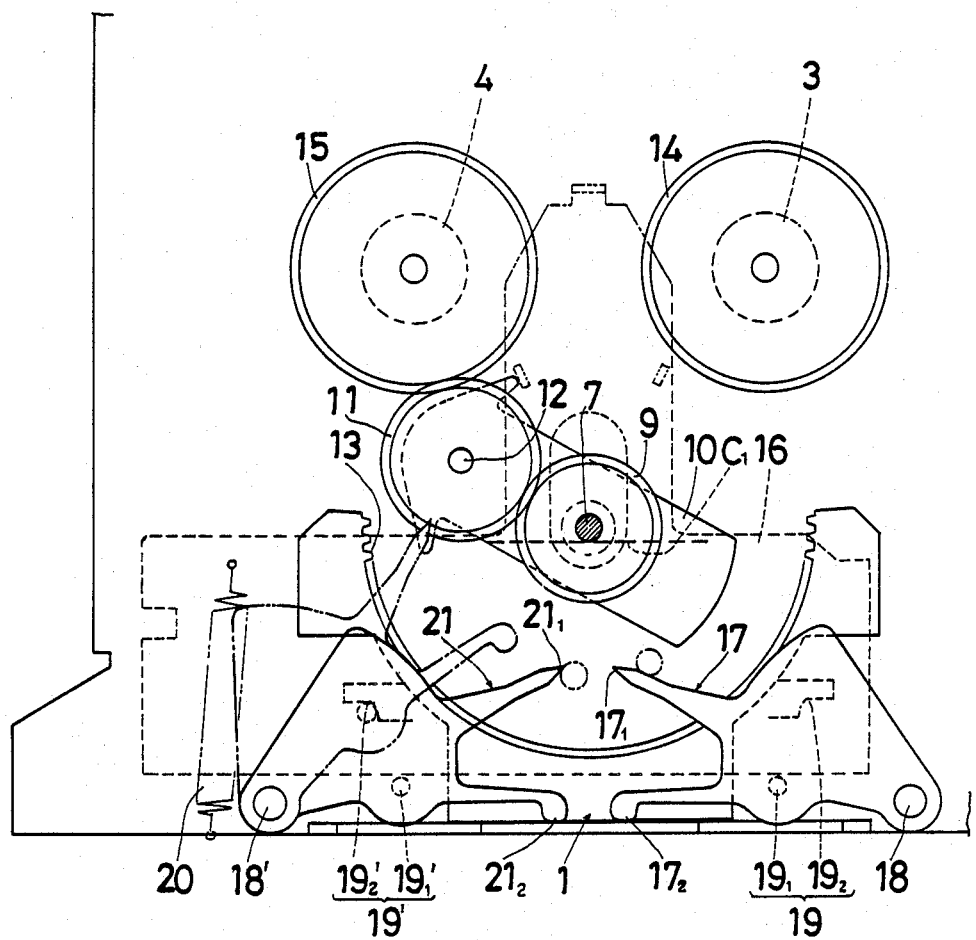
FIG. 5 is a diagrammatic bottom plan view, with portions omitted for the sake of simplicity, of the apparatus shown in FIG. 4, and illustrates a state wherein a head base is advanced to occupy a recording and reproduction position for a tape cassette carried on reels.

FIG. 1 is a diagrammatic bottom plan view of the essential mechanism of a cassette tape drive apparatus according to a first embodiment of the present invention, FIG. 2 is a diagrammatic sectional view taken along the line 2—2 of FIG. 1, FIG. 3 is a partially simplified bottom plan view of the apparatus of FIG. 1, with a head base advanced to occupy a recording and reproduction position for a tape cassette carried on reels, FIG. 4 is a diagrammatic bottom plane view of the essential mechanism of a second embodiment of the cassette tape drive apparatus provided with a high-speed erasing mechanism, and FIG. 5 is a partially simplied bottom plan view of the apparatus of FIG. 4, with a head base advanced to occupy a recording and reproduction position for a tape cassette carried on reels.

As shown in FIGS. 1 to 3, the illustrated cassette tape drive apparatus comprises a body plate 1, a motor 2 capable of being activated in forward and reverse directions and situated on the top side (non-visible side in FIG. 1) of the body plate 1, a playback reel 3, a rewind reel 4, a small-diameter pulley 5 attached to an output shaft $2_1$ of the motor 2 at the bottom side (visible side in FIG. 1) of the body plate 1, a belt 6 for transmitting the power of the motor 2 to a fly pulley 8, a capstan shaft 7, the fly pulley 8 located coaxially to the capstan shaft 7, a fixed gear 9 formed integrally with and coaxially to the fly pulley 8, a rotary bar 10 arranged to rotate coaxially to both the capstan shaft 7 and the fly pulley 8, an idle gear 11 carried by the rotary bar 10 to be normally meshed with the fixed gear 9 integral with the fly pulley 8, and a projection 12 provided on the rotary bar 10. In the illustrated example, the projection 12 is formed to serve as a pin by extending the shaft of the idle gear 11. The illustrated drive apparatus also comprises an internal gear portion 13 which has an inwardly arcuated toothed surface for enmeshment with the idle gear 11 which rotates with the rotary movement of the rotary bar 10. In the illustrated example, the internal gear portion 13 is formed concentrically with respect to the capstan shaft 7 of the rotary bar 10.

Also, the illustrated drive apparatus comprises a playback reel gear 14 coaxial to the playback reel 3, a rewind reel gear 15 coaxial to the rewind reel 4, a head base 16 located on the top side of the body plate 1 for carrying a recording and reproducing head $16_1$, an erasing head $16_2$, a pinch roller $16_3$ and their associated components, and a playback arm 17 for moving the head base 16 toward and away from a tape surface $C_1$ of a cassette tape C. The playback arm 17 is formed such that its proximal end is rotatably fitted onto a mounting shaft 18, and a distal end $17_1$ is formed for engagement with the projection 12 of the rotary bar 10 with a positioning stopper $17_2$ formed to hold the playback arm 17 in position at its retracted position.

A lock mechanism 19 causes the head base 16 to advance toward the tape surface $C_1$ of the cassette tape C and to stop and hold the head base 16 at a recording and reproduction position. The lock mechanism 19 is constituted by a projection $19_1$ formed on one surface of the playback arm 17 and a recessed portion $19_2$ which is formed on a part extending from the head base 16 toward the projection $19_1$ so as to face the projection $19_1$ for engagement therewith. The lock mechanism 19 is adapted to move into and out of its locked state by the rotary motion of the playback arm 17. A spring 20 is disposed to impart a pulling force to the head base 16 so that the head base 16 may be retracted from the tape surface $C_1$.

Referring to FIGS. 4 and 5, a second embodiment of the present invention further comprises a review arm 21 for high-speed easing purposes. The review arm 21 and the playback arm 17 are disposed on symmetrically opposing sides of a plane normal to the axis of the capstan shaft 7.

OPERATIONS AND SEQUENCE EXAMPLES

The following is a description of the operations and their sequence examples of the first embodiment including the following basic mechanisms which will be explained in (1) to (5) and those of the second embodiment which further includes a high-speed erasing mechanism which will be described below in (6).

(1) Operation from Stop State to Recording or Reproduction Step (FIGS. 1 to 3)

When the motor 2 is in a stop state, the idle gear 11 is located at an intermediate position (as shown by solid lines in FIG. 1) between the rewind reel gear 15 and the playback arm 17, and the head base 16 stands by at its original position where the magnetic heads $16_1$ and $16_2$ are retracted from the tape surface $C_1$ of the cassette tape C.

When the motor 2 is activated in the forward direction (indicated by an solid-line arrow in FIG. 1), the power of the motor 2 is transmitted from the small-diameter pulley 5 coaxial to the output shaft $2_1$ of the motor 2 to the fixed gear 9 through the belt 6 and the fly pulley 8.

When the idle gear 11, in mesh with the fixedly mounted gear 9, is rotated, the rotary bar 10 which rotatably supports this gear 11 also rotates. The idle gear 11 rotates with the rotary bar 10 and comes in mesh with the internal gear portion 13, so that a high driving force is applied to the idle gear and to the rotary bar. This also applies a strong driving force to the projection 12 of the rotary bar 10, and this projection 12 causes the playback arm 17 to rotate about its mounting shaft 18. As a result, the projection $19_1$ of the playback arm 17 moves the head base 16 upwardly.

When the rotary bar 10 rotates along the internal gear portion 13 together with the rotation of the idle gear 11, the projection $19_1$ of the playback arm 17 comes into engagement with the recessed portion $19_2$ of the head base 16.

As the projection 12 of the rotary bar 10 moves further along the internal gear portion 13, it moves beyond the distal end $17_1$ of the playback arm 17. At this time, the projection $19_1$ of the playback arm 17 is moved back from a slightly overstroked state by the resilient pressing force between the pinch roller $16_3$ on capstan shaft 7 and the force of the spring 20, and it is engaged with the recess portion $19_2$ of the head base 16 to be locked there.

In this manner, the head base 16 is advanced to and held in a predetermined position at which the magnetic heads $16_1$ and $16_2$ are maintained in contact with the tape surface $C_1$. Thus, the recording and reproducing magnetic head $16_1$ are kept in contact with the tape surface $C_1$ and the pinch roller $16_3$ is pressed against the capstan shaft 7.

As the aforesaid projection 12 moves beyond the distal end $17_1$ of the playback arm 17, the recessed portion $19_2$ returns from a position at which it is pressed upwardly by the overstroke to a regular position by a combination of the pressure of the pinch roller $16_3$ against the capstan shaft 7 and the force of the spring 20 to act to retract the head base 16, and the projection $19_1$ engages with the recessed portion $19_2$ at the regular position. Therefore, the playback arm 17 is also reversed by a slight amount. When the projection 12 returns after it has moved beyond the distal end $17_1$, the projection 12 again engages with the distal end $17_1$ of the playback arm 17.

The continuous forward motion of the motor 2 causes the idle gear 11 to engage with the playback reel 14, thereby rotating the playback reel 3 to initiate winding of the cassette tape C. Thus, a recording or reproduction operation is enabled (as shown in FIG. 3).

(2) Operation from Recording or Reproduction State to Stop Step

In the recording or reproduction state shown in FIG. 3, when the motor 2 is activated in the reverse direction, power is transmitted from the small-diameter pulley 5 to the fixed gear 9 through the belt 6 and the fly pulley 8 to disengage the idle gear 11 from the playback reel gear 14, thereby stopping winding of the tape C.

Then, the projection 12 of the rotary bar 10 engages with the distal end $17_1$ of the playback arm 17 to cause the playback arm 17 to rotate downwardly (as viewed in FIG. 1 or 3), thereby causing the playback arm 17 to rotate about the axis of the mounting shaft 18 in the downward direction. The resultant force causes the lock mechanism 19 ($19_1$ and $19_2$) to be released from its locked state, and the head base 16 is restored to its original position by the pulling force of the spring 20. In the original position, the playback arm 17 is positioned at a predetermined location on the body plate 1 by means of the stopper portion $17_2$.

In this state, the idle gear 11 is further reversed along the internal gear portion 13 with a rotary motion, to press the distal end $17_1$ of the playback arm 17 in the downward direction. Immediately after the idle gear 11 has moved beyond the distal end $17_1$, the motion of the motor 2 is stopped.

It is to be noted that the driving of the motor 2 for causing the aforesaid forward and reverse rotations of the idle gear 11 is controlled by the function of a CPU incorporated in the drive apparatus according to the present invention.

(3) Operation from Stop State to Rewind Step

When the motor 2 is reversed, power is transmitted from the small-diameter pulley 5 to the idle gear 11 through the belt 6, the fly pulley 8 and the fixed gear 9. The idle gear 11 meshes with the rewind reel gear 15 (as shown by a two-dot chain line in FIG. 1) to cause the review reel 4 to rotate, thereby initiating rewinding of the tape C.

In this state, if the motion of the motor 2 is stopped, the rewinding operation stops.

(4) Operation from Stop State to Rapid Feed Step

When the motor 2 is activated in the forward direction, power is transmitted from the small-diameter pulley 5 to the idle gear 11 through the belt 6, the fly pulley 8 and the fixed gear 9. The idle gear 11 meshes with the internal gear portion 13 and moves therealong with a rotary motion. When the projection 12 engages with the distal end $17_1$ of the playback arm 17, the idle gear 11 causes the playback arm 17 to rotate about the axis of the mounting shaft 18 in the upward direction (as viewed in, for example, FIG. 1) via the projection 12. The projection 12 moves beyond the distal end $17_1$ and moves out of engagement therewith, at which time the head base 16 is temporarily locked in its recording or reproducing state.

In this state, if the motor 2 is stopped and then reversed in its stop state, the projection 12 of the rotary bar 10 engages with the distal end $17_1$ of the playback arm 17 to cause the playback arm 17 to rotate in the downward direction to release the lock mechanism 19 ($19_1$ and $19_2$) from its locked state, thereby restoring the head base 16 to its original position. Thereafter, the reverse motion of the motor 2 is again stopped at a position where the projection 12 is not allowed to move beyond the playback arm 17. Then, when the motor 2 is activated in the forward direction, the idle gear 11 meshes with the internal gear portion 13, then moves therealong with a rotary motion, and further meshes with the playback real gear 14. If, in this state, only the playback reel 3 is rotated with the head base 16 maintained at the original position, the cassette tape C can be fed rapidly.

(5) Operation from Rapid Feed State to Step

When the motor 2 is reversed in this rapid feed state, the idle gear 11 is moved out of enmeshment with the playback reel 3 and thus the rapid feed operation of the playback reel 3 stops. Then, the motor 2 is stopped after the projection 12 of the rotary bar 10 has moved beyond the distal end $17_1$ of the playback arm 17. Thus, the idle gear 11 stops at an intermediate position between the playback arm 17 and the rewind reel gear 15. This intermediate position is a stop position (at which the head base 16 is restored in its original position).

(6) Operating Sequence of High-Speed Erasing Mechanism

The second embodiment provided with the high-speed erasing mechanism operates in the following sequence.

In a stop state, the idle gear 11 is positioned at an intermediate location between the rewind reel 4 and the review arm 21, at which time the head base 16 is restored in its original position.

(1) In order to proceed from the above stop state to a recording or reproduction step, the motor 2 is activated in the forward direction, and power is transmitted from the small-diameter pulley 5 to the idle gear 11 through the belt 6, the fly pulley 8 and the fixed gear 9. The idle gear 11 which rotates integrally with the movement of the rotary bar 10 meshes with the internal gear portion 13 and moves therealong in the downward direction (as viewed in FIG. 4) with a rotary motion. The projection 12 engages with a distal end $21_1$ of the review arm 21, causes the review arm 21 to rotate downwardly, and moves beyond the distal end $21_1$. The subsequent operation is the same as that of the playback arm 17 which has been explained above in "(1) Operation from Stop State to Recording or Reproducing Step (FIGS. 1 to 3)".

(2) The operation from the recording or reproduction state to the stop step is executed in a sequence similar to the operating sequence which has been explained above in "(2) Operation from Recording or Reproducing State to Stop Step" in the process from the step in which the idle gear 11 disengages from the playback reel gear 14 to the step in which the projection 12 rotates the playback arm 17 downwardly and moves beyond the distal end $17_1$.

After the projection 12 has rotated the playback arm 17 downwardly and moved beyond the distal end $17_1$, the projection 12 engages with the distal end $21_1$ of the review arm 21 to rotate it upwardly. A second lock mechanism 19' is constituted by a projection $19'_1$ of the review arm 21 and a recessed portion $19'_2$ which is formed on a part extending from the head base 16 toward the projection $19'_1$ so as to face the projection $19'_1$. As the result of the upward rotary motion of the review arm 21, the projection $19'_1$ and the recessed portion $19'_2$ are brought into engagement with each other and the second lock mechanism 19' are locked. The idle gear 11 is further rotated and, immediately after the projection 12 has moved beyond the distal end $21_1$ of the review arm 21, the motion of the motor 2 is stopped.

Then, the motor 2 is reversed to cause the review arm 21 to rotate downwardly by the movement of the projection 12 of the rotary bar 10, thereby releasing the lock mechanism 19 from its locked state. The head base 16 is restored to its original position, at which the motion of the motor 2 is stopped.

(3) The operation from the stop state to the rewind step is the same as the operation of the playback arm 17 which has previously been described in "(3) Operation from Stop State to Rewind Step".

(4) The operation from the stop state to the rapid feed step is the same as the operation of the playback arm 17 which has previously been described in "(4) Operation from Stop State to Rapid Feed Step".

(5) The transition from the rapid feed state to the stop step is as follows. When the motor 2 is stopped and then reversed, the idle gear 11 moves out of enmeshment with the playback reel 3 and brings the projection 12 of the rotary bar 10 into engagement with the distal end $17_1$ of the playback arm 17, thereby rotating the playback arm 17 downwardly. The idle gear 11 further moves with a rotary motion and causes the projection 12 to move beyond the distal end $17_1$ of the playback arm 17 and engage with the distal end $21_1$ of the review arm 21. After having rotated the review arm 21 to its upper position, the projection 12 moves beyond the distal end $21_1$, at which time the reverse motion of the motor 2 is stopped. Thereafter, the motor 2 is activated in the forward direction to move the review arm 21 downwardly, thereby releasing the second lock mechanism 19' ($19_1$ and $19_2$) from its locked state and restoring the head base 16 to its original position. At this time, the projection 12 is maintained at a position where it does not move beyond the distal end $21_1$ of the review arm 21 and, at this position, the motion of the motor 2 is stopped.

(6) The transition from the stop state to the high-speed erasing step is as follows. When the motor 2 is activated in the forward direction, the idle gear 11 is moved along the internal gear portion 13 with a rotary motion, and the projection 12 of the rotary bar 10 engages with the distal end $21_1$ of the review arm 21. After the projection 12 has rotated the review arm 21 downwardly and moved beyond the distal end $21_1$, the motion of the motor 2 is stopped. Then, when the motor 2 is reversed, the idle gear 11 returns along the internal gear portion 13 with a rotary motion to cause the review arm 21 to rotate upwardly by means of the projection 12. At this time, the head base 16 is advanced to a predetermined position and is maintained at this position by locking the lock mechanism 19' ($19'_1$ and $19'_2$).

In this state, the magnetic heads $16_1$ and $16_2$ are maintained in contact with the tape surface $C_1$, but the pinch roller $16_3$ is located in close proximity to the capstan shaft 7. This position of the head base 16 differs from the position occupied by the same in its recording or reproduction state. Such difference in position of the head base 16 is derived from the positional relationships between the arms $19_1$ and $19'_1$ which constitute the lock mechanisms 19 and 19' and the recessed portions $19_2$ and $19'_2$ of the head base 16, respectively.

Further, when the reverse motion of the motor 2 is continued, the idle gear 11 meshes with the rewind reel 4. In this meshed state, the erasing head $16_2$ is maintained in contact with the tape surface $C_1$ with the pinch roller $16_3$ out of contact with the capstan shaft 7. The tape C is rewound at high speeds and, accordingly, if the erasing head $16_2$ is energized, the record on the tape C is erased at high speeds.

(7) The transition from the high-speed erasing state to the stop state is performed as follows. After the reverse motion of the motor 2 has been stopped, the motor 2 is activated in the forward direction to cause the idle gear 11 to mesh with the internal gear portion 13, thereby causing the idle gear 11 to move along the internal gear portion 13 with a rotary motion. Thus, the projection 12 of the rotary bar 10 engages with and rotates the review arm 21 downwardly, so that the locked state of the lock mechanism 19' ($19'_1$ and $19'_2$) is released. Immediately after the head base 16 has been restored to its original position, the forward running of the motor 2 is stopped.

As described above, in accordance with the present invention, the idle gear meshes with the internal gear portion so that a large driving force can be produced without the need to use the attraction of any solenoid. The resultant driving force is used to move the head base toward and away from a cassette tape by means of the playback arm and the review arm and, in addition, such a driving force is utilized to press the pinch roller against the capstan shaft. The present apparatus further includes the lock mechanism for locking the head base with respect to the playback arm and the review arm. Accordingly, the present invention provides the advantage that it is possible to advance the head base to press the pinch roller against the capstan shaft as well as to positively and easily determine the forward and backward lock positions of the head base without the use of any complicated structure.

Accordingly, the advancement and retraction of the head base can be achieved without the use of the attraction of any type of solenoid and yet with retaining the function equivalent to that of the solenoid being retained. Specifically, it is possible to positively effect operations such as recording, reproduction, rewind, rapid feed, and stop as well as high-speed erasing.

Since no electric power consumed for the operation of the solenoid is needed, power consumption is remarkably reduced and the capacity and external size of an adapter can be decreased.

Also, since the present drive apparatus can be driven by the power of dry batteries, a user can carry it to a desired place. Since no solenoid is used, mechanism parts associated therewith can be omitted. Accordingly, it is possible to miniaturize the cassette tape drive apparatus as a whole and hence to provide a novel and useful cassette tape drive apparatus.

What is claimed is:

1. A cassette tape drive apparatus having a capstan shaft, a pair of reels and magnetic heads, said apparatus comprising:
   a head base for carrying the magnetic heads;
   a fly pulley disposed coaxially to said capstan shaft;
   a fixedly positioned gear formed coaxially to said fly pulley and secured to move therewith;
   a rotary bar disposed to rotate about the axis of said capstan shaft, said rotary bar being provided with an idle gear and a projection;
   an internal gear portion disposed to be in mesh with said idle gear and which rotates about said axis of said capstan shaft together with said rotary bar and which is rotated by said fixedly positioned gear; and
   an arm mechanism for causing said head base to move towards and away from a tape surface by means of said projection and means for locking said head base at a position thereof with the heads in contact with a tape surface.

2. A cassette tape drive apparatus according to claim 1 further comprising a review arm for enabling high-speed erasure of a tape, said review arm and said arm mechanism being disposed on symmetrically opposing sides of a plane normal to the axis of said capstan shaft, said review arm being rotated back and forth by means of said projection of said rotary bar to move said head base which carries a high-speed erasing head toward and away from the tape surface of said tape carried on said reels.

3. A magnetic head moving mechanism as in claim 1 and further comprising cooperating head locking means on said arm and on said head base to releasably lock said base in said tape engaging position.

4. A magnetic head positioning mechanism comprising:
   a movably mounted head base carrying magnetic heads;
   a driven, fixedly positioned gear;
   a bar mounted for rotation about the axis of said driven gear, and having a projection extending therefrom;
   an idler gear mounted for movement on said bar and driven by said driven gear;
   a fixedly positioned internal gear portion located to mesh with said idler gear and to drive said bar; and
   an arm having a contact portion adapted to be moved by contact of said contact portion with said projection, wherein
   said arm engages and moves said head base to a tape engaging position.

5. A magnetic head moving mechanism as in claim 4 further comprising a further arm for high speed erasure of the tape, said further arm and said arm being disposed on symmetrically opposing sides of a plane normal to the axis of said driven gear, said further arm adapted to be rotated back and forth by means of said projection of said rotary bar to move said head base which carries a high speed erasing head towards and away from the tape surface of said tape.

* * * * *